US007249065B2

(12) United States Patent
Bliakhman et al.

(10) Patent No.: US 7,249,065 B2
(45) Date of Patent: Jul. 24, 2007

(54) SUPPLIER PROXY STORE TO VIRTULIZE AN EXTERNAL BUSINESS ENTITY

(75) Inventors: Stanislav Bliakhman, North York (CA); Howard Borenstein, Downsview (CA); Victor S. Chan, Thornhill (CA); Robert M. H. Dunn, Toronto (CA); Nelson Jean, Markham (CA); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 10/773,680

(22) Filed: Feb. 6, 2004

(65) Prior Publication Data

US 2004/0267632 A1 Dec. 30, 2004

(30) Foreign Application Priority Data

Jun. 25, 2003 (CA) .................................. 2433826

(51) Int. Cl.
  G06Q 30/00 (2006.01)
  G06F 7/00 (2006.01)
(52) U.S. Cl. ........................................ 705/26; 705/27
(58) Field of Classification Search .................. 705/26, 705/27, 28, 29, 80, 22
  See application file for complete search history.

(56) References Cited

U.S. PATENT DOCUMENTS

| | | | |
|---|---|---|---|
| 6,101,482 A | 8/2000 | DiAngelo et al. | 705/26 |
| 6,556,975 B1 * | 4/2003 | Wittsche | 705/26 |
| 6,816,843 B1 * | 11/2004 | Baughman | 705/64 |
| 6,850,900 B1 * | 2/2005 | Hare et al. | 705/26 |
| 2001/0011247 A1 | 8/2001 | O'Flaherty et al. | 705/39 |
| 2002/0077937 A1 * | 6/2002 | Lyons et al. | 705/28 |
| 2002/0088001 A1 * | 7/2002 | Zustak et al. | 725/109 |
| 2002/0107763 A1 * | 8/2002 | Palmer et al. | 705/29 |
| 2002/0133414 A1 * | 9/2002 | Pradhan et al. | 705/26 |
| 2002/0152133 A1 * | 10/2002 | King et al. | 705/26 |
| 2002/0198814 A1 * | 12/2002 | Bansal et al. | 705/37 |
| 2003/0033205 A1 * | 2/2003 | Nowers et al. | 705/26 |
| 2003/0036991 A1 * | 2/2003 | Fortes et al. | 705/37 |
| 2003/0204448 A1 * | 10/2003 | Vishik et al. | 705/27 |
| 2005/0027611 A1 * | 2/2005 | Wharton | 705/26 |

FOREIGN PATENT DOCUMENTS

| WO | 0022560 | 10/1999 |
|---|---|---|
| WO | WO 200116768 A1 * | 3/2001 |

OTHER PUBLICATIONS

Unknown author, "dChain Commerce Partners With webMethods To Deliver Comprehensive eMarketplace Solution For Traditional Distribution Businesses," PR Newswire, New York, Jul. 31, 2000, p. 1.*

* cited by examiner

Primary Examiner—Jeffrey A. Smith
Assistant Examiner—Amee A. Shah
(74) Attorney, Agent, or Firm—Winstead PC (57) ABSTRACT

A commerce site for exchanging commerce information with a plurality of remote store sites and shopper clients over a network, the commerce site including a marketplace store for exchanging information with shopper clients and remote store sites through the network; and a plurality of proxy stores, each proxy store associated with one of the remote store sites for communicating therewith over the network and acting as an intermediary for information exchanged between the associated remote store site and the marketplace store.

18 Claims, 7 Drawing Sheets

Order Quotation Relationship Objects

| Parent 310 Order ID | Child ID 402 | Proxy 404 Store ID | Relationship Type ID 314 | Contract ID 408 | Display Seq. 410 | Time-Out 412 |
|---|---|---|---|---|---|---|
| 1001 | 1002 | A | Initial | ABC-123 | 1 | |
| 1001 | 1003 | B | Initial | DEF-345 | 2 | |
| 1001 | 1004 | A | Selection | ABC-123 | 1 | |
| 1001 | 1005 | B | Selection | DEF-345 | 2 | |
| 1001 | 1006 | A | Final | ABC-123 | 1 | |
| 1001 | 1007 | B | Final | DEF-345 | 2 | |
| 1001 | 1008 | A | Submission | ABC-123 | 1 | |
| 1001 | 1009 | B | Submission | DEF-345 | 2 | |

Initial Quotation Order Object (PROXY STORE A) ⟋205 (Proxy Store A)

402—Child Object ID: 1002

| Asset ID 304 | Quantity 602 | Price 604 | Availability Date 606 | Alternate Product 608 | Correlation ID 610 |
|---|---|---|---|---|---|
| 234 (Computer Mouse) | 100 | 9.99 | Now | No | 10 |
| 238 (Keyboard) | 30 | 14.99 | Now | No | 11 |
| 238 (Keyboard) | 20 | 14.99 | 30 Days | No | 11 |
| 198 (21" Brand X Monitor) | 10 | 1499.00 | Now | No | 12 |
| 205 (17" Brand Y Monitor) | 20 | 399.00 | Now | Yes | 13 |

Initial Quotation Order Object (PROXY STORE B) ⟋205 (Proxy Store B)

402—Child Object ID: 1003

| Asset ID 304 | Quantity 602 | Price 604 | Availability Date 606 | Alternate Product 608 | Correlation ID 610 |
|---|---|---|---|---|---|
| 234 (Computer Mouse) | 100 | 10.99 | Now | No | 10 |
| 238 (Keyboard) | 10 | 14.99 | Now | No | 11 |
| 198 (21" Brand X Monitor) | 10 | 1599.00 | Now | No | 12 |
| 205 (17" Brand X Monitor) | 20 | 399.00 | Now | No | 13 |

FIG. 6

Selection Order Object (Proxy Store A) — 207 (Proxy Store A)

402 — Child Object ID: 1004

| Asset ID 304 | Quantity 704 | Price 604 | Availability Date 606 | Correlation ID 610 |
|---|---|---|---|---|
| 234 (Computer Mouse) | 100 | 9.99 | Now | 10 |
| 238 (Keyboard) | 30 | 14.99 | Now | 11 |
| 198 (21" Brand X Monitor) | 10 | 1499.00 | Now | 12 |
| 205 (17" Brand Y Monitor) | 20 | 399.00 | Now | 13 |

702

Selection Order Object (Proxy Store B) — 207 (Proxy Store A)

402 — Child Object ID: 1005

| Asset ID 304 | Quantity 704 | Price 604 | Availability Date 606 | Correlation ID 610 |
|---|---|---|---|---|
| 238 (Keyboard) | 10 | 14.99 | Now | 11 |

Final Quotation Order Object (Proxy Store A) — 209 (Proxy Store A)

Child Object ID: 1006

| Asset ID 304 | Quantity 704 | Price 604 | Availability Date 606 | Alternate Product 608 | Correlation ID 610 |
|---|---|---|---|---|---|
| 234 (Computer Mouse) | 100 | 9.99 | Now | No | 10 |
| 238 (Keyboard) | 30 | 14.99 | Now | No | 11 |
| 198 (21" Brand X Monitor) | 10 | 1499.00 | Now | No | 12 |
| 205 (17" Brand Y Monitor) | 20 | 399.00 | Now | No | 13 |

Final Quotation Order Object (Proxy Store B) — 209 (Proxy Store B)

Child Object ID: 1007

| Asset ID 304 | Quantity 704 | Price 604 | Availability Date 606 | Alternate Product 608 | Correlation ID 610 |
|---|---|---|---|---|---|
| 238 (Keyboard) | 10 | 14.99 | Now | No | 11 |

FIG. 9

Submission Order Object (Proxy Store A) — 211 (Proxy Store A)

Child Object ID: 1008

| Asset ID 304 | Quantity 704 | Price 604 | Availability Date 606 | Correlation ID 610 |
|---|---|---|---|---|
| 234 (Computer Mouse) | 100 | 9.99 | Now | 10 |
| 238 (Keyboard) | 30 | 14.99 | Now | 11 |
| 198 (21" Brand X Monitor) | 10 | 1499.00 | Now | 12 |
| 205 (17" Brand Y Monitor) | 20 | 399.00 | Now | 13 |

Submission Order Object (Proxy Store B) — 211 (Proxy Store B)

Child Object ID: 1009

| Asset ID 304 | Quantity 704 | Price 604 | Availability Date 606 | Correlation ID 610 |
|---|---|---|---|---|
| 238 (Keyboard) | 10 | 14.99 | Now | 11 |

FIG. 10

Order Tracking Record ─213

Order Submission Child Object ID: 1005
Remote Store ID: Store 345
Order Status: Partially Shipped
Total Order Asset Cost: $24,418.70
Shipping Charges: $59.99
Tax Charges: $244.49

| Asset ID | Quantity | Price | Status |
|---|---|---|---|
| 234 (Computer Mouse) | 100 | 9.99 | Shipped |
| 238 (Keyboard) | 30 | 14.99 | Partially Shipped |
| 198 (21" Brand X Monitor) | 10 | 1499.00 | Shipped |
| 205 (17" Brand Y Monitor) | 20 | 399.00 | Confirmed |

FIG. 11

Inventory Report ─280

| Inventory Record Id | Product | Available Quantity | Proxy Store Id | Last Update Date |
|---|---|---|---|---|
| 101 | Keyboard | 1000 | Proxy Store A | 03/01/2002 |
| 102 | 21" SONY monitor | 350 | Proxy Store B | 02/01/2002 |

─290

| Inventory Record Id | Adjustment Quantity | Adjustment Date |
|---|---|---|
| 101 | -200 | 01/01/2002 |
| 101 | -350 | 02/01/2002 |
| 101 | +600 | 03/01/2002 |
| 102 | -1000 | 01/15/2002 |
| 102 | +500 | 02/01/2002 |

FIG. 12

SUPPLIER PROXY STORE TO VIRTULIZE AN EXTERNAL BUSINESS ENTITY

CROSS REFERENCE TO RELATED APPLICATIONS

This Application claims priority under 35 U.S.C. §119(a) to Canadian Patent Application No. 2433826, filed Jun. 25, 2003, which is hereby incorporated herein by reference in its entirety.

TECHNICAL FIELD

The present invention relates in general to managing information in an electronic commerce system.

BACKGROUND INFORMATION

There has been explosive growth in the use of the World Wide Web as a medium for providing information about products and services, and in some cases, permitting on-line ordering and purchasing. However, in many cases it remains difficult for buyers to efficiently receive and compare pricing and other information about the products and services of competing suppliers, and to order products from suppliers and track what has been ordered. In some situations, suppliers use different e-commerce outlets that make comparisons and order tracking cumbersome or difficult. In some situations, suppliers are deterred by technical and cost issues from making adequate use of e-commerce.

Thus, there is a need for an e-commerce solution that efficiently and cost effectively facilitates on-line quoting, ordering, order tracking and inventory tracking in a multi-supplier environment.

SUMMARY OF THE INVENTION

A supplier proxy store is used at a common electronic marketplace to represent a remote supplier store. According to various aspects of the invention, the proxy store manages data assets of the remote store to support processes of obtaining and displaying quotations, creating orders, submitting orders, tracking orders and/or tracking inventory.

According to one aspect of the invention, there is provided a commerce site for exchanging commerce information with a plurality of remote store sites and shopper clients over a network, the commerce site including a marketplace store for exchanging information with shopper clients and remote store sites through the network. The commerce site includes a plurality of proxy stores, each proxy store associated with one of the remote store sites for communicating therewith over the network and acting as an intermediary for information exchanged between the associated remote store site and the marketplace store.

According to another aspect of the invention, there is provided a method of processing information through a network connected to a marketplace commerce site, a plurality of remote store sites, and a shopper client, the method including: a) providing at the commerce site a catalog identifying an aggregation of assets available through the remote store sites; a) providing at the commerce site a marketplace store interface through which a shopper at the shopper client can select assets from the catalog; c) providing at the commerce site a plurality of proxy stores, each proxy store representing an associated remote store site; d) generating and storing at the marketplace commerce site, a parent order object that includes a parent list of parent items, each parent item identifying an associated asset selected by the shopper from the catalog; and e) generating first requests at selected proxy stores that are associated with remote store sites specified by the shopper first request, each of the selected proxy stores sending the first request generated thereby to its associated remote store over the network, the first requests each identifying assets identified in the parent list.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific network configuration, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The following detailed description of specific embodiments of the present invention does not limit the implementation of the invention to any particular computer programming language. The present invention may be implemented in any computer programming language provided that the operating system provides the facilities to support the requirements of the present invention. In one embodiment, the present invention is implemented, at least partly, in the Java computer programming language. Any limitations presented herein as a result of a particular type of operating system or computer programming language are not intended as limitations of the present invention.

Figure 1:
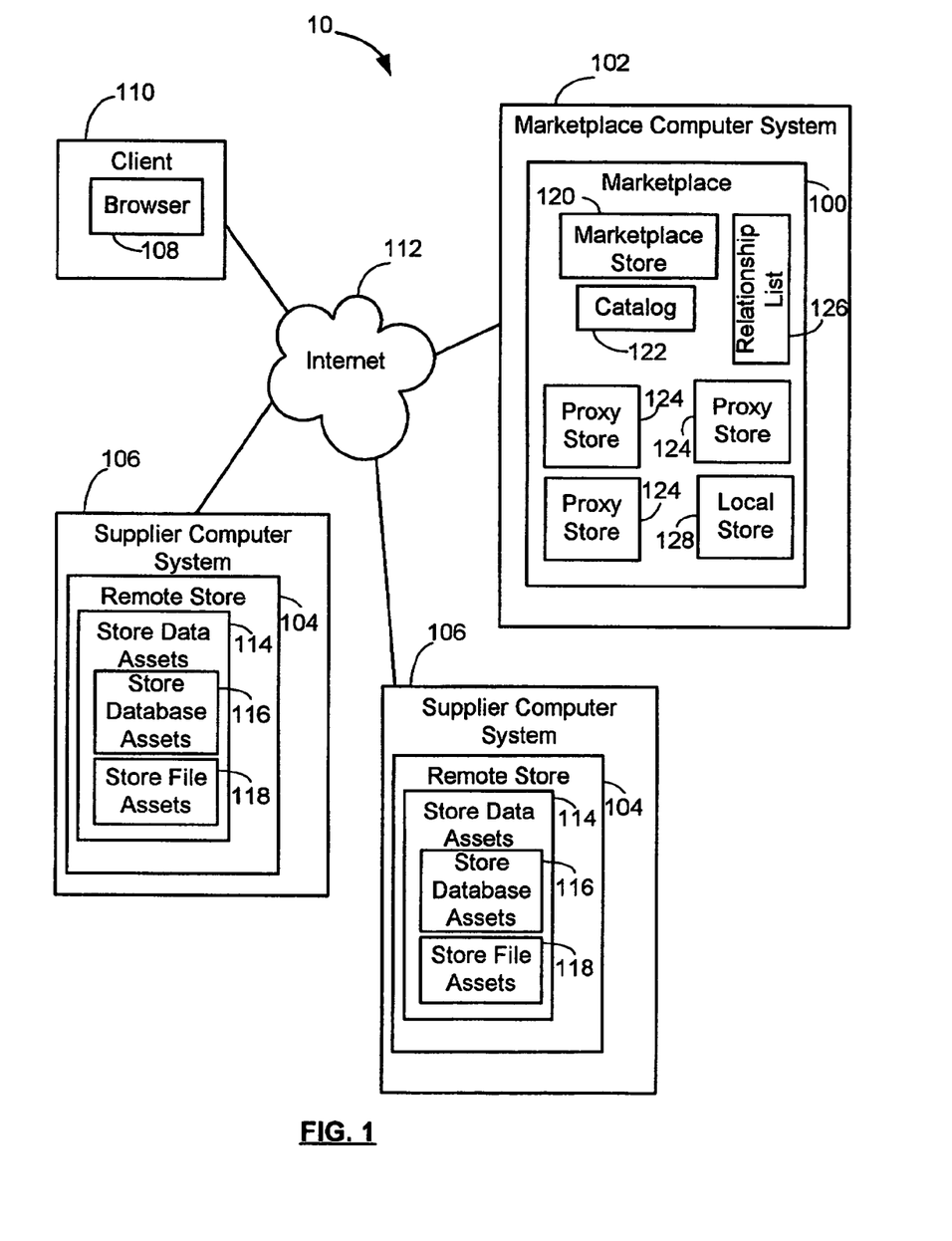
FIG. 1 is a block diagram of a representative system in which the present invention is implemented.

A representative system 10 in which the present invention is implemented is shown in FIG. 1. A marketplace computer system 102 is connected to a communications network 112, which in various example embodiments includes the Internet, an intranet and/or other local or wide area network connections, and combinations of the forgoing. The system 102 hosts a marketplace Website 100. The marketplace 100 is, in an example embodiment, a business-to-business electronic commerce Website in which selected organizations that are granted access to the site are presented with a unified view of assets (for example, products, services and/or intangible assets) that are traded on the site. The marketplace 100 provides hosting services to facilitate the selling, purchasing or exchanging of assets by participating parties. The system 102 may include a single computer or a number of computers connected to communicate with each other.

The system 10 also includes a number of remote supplier computer systems 106 and remote shopper client computer systems 110 that exchange information with the marketplace computer system 102 over the communications network 112. Remote supplier computer systems 106 host remote store commerce sites 104 that communicate with the marketplace 100, and shopper clients 110 have browsers 108 for accessing the marketplace 100.

The marketplace 100 provides hosting services to remote stores 104 that offer assets for sale in the marketplace catalog 122. The marketplace also includes local stores 128 that offer assets for sale in the marketplace catalog 122, and includes a marketplace store 120 which has access to a browsable marketplace catalog 122. The marketplace catalog 122 is an aggregation of tradable assets, which may be products, services or intangible assets, which are offered for sale by remote stores 104 and local stores 128 through the marketplace 100. In an example embodiment, the same or similar assets are offered by different competing remote stores 104 and local stores 128. The marketplace 100 is configured to communicate with remote stores to support shopping processes including catalog browsing, asset price and availability querying, order taking, order status checking and inventory report generating.

A shopper using browser 108 can navigate through the marketplace catalog 122, and add assets of interest to a shopping cart, which is an electronic list of tradable assets that a shopper has an interest in and that can be used for inquiring about item price and/or availability. The shopper can request quotations based on the contents of the shopping cart, such that asset price and availability quotations can be obtained from remote stores 104 and local stores 128, allowing shoppers to make purchasing decisions based on factors such as competitiveness of asset pricing and/or product availability. Substitution products can be offered by the remote stores when, for example, the requested asset is not available.

In example embodiments of the invention, once a shopper has added one or more assets from the marketplace catalog to a shopping cart, they can work their way though obtaining quotations for the products and purchasing them as desired until all assets that are desired in the shopping cart are purchased. In some embodiments, shoppers can keep track of assets and quantities that have been purchased, the remote stores from which they were purchased, order total cost, and fulfillment status.

Each remote store 104 and local store 128 includes store data assets 114, which include store database assets 116 and store file assets 118. Store database assets 116 include information for supporting quotation, shopping and administrative activities, including for example: offered asset identification, description and pricing information; information about orders and the status of such orders; and inventory information. Store file assets 118 include Web assets, for example the files used to create Web pages for the remote store or local store, such as HTML files, JSP files, image and graphics files, and text files. In an example embodiment, local stores 128 and remote stores 104 are similarly configured supplier stores, with one notable difference being that the store data assets 114 of remote stores 104 are at least partly hosted and stored at remote supplier computer systems 106, whereas the store data assets of local stores 128 are locally stored and hosted at the marketplace computer system 102. The marketplace store 120 also includes database and file assets as required to carry out its functions.

According to the present invention, in order to facilitate efficient management and storage of quotations, orders, order status and inventory level data in respect of the remote stores 104 to support an order and quotation process, the marketplace 100 includes proxy stores 124, each of which represents a corresponding remote store 104 or local store 128. The proxy stores 124 act as an intermediary between the marketplace store 120 and remote stores 104 and local stores 128 for quotation requests, order submissions, and other requests. In an example embodiment, the marketplace store 120 exchanges information and commands using a common protocol with all the proxy stores 124, which each communicate with their respective remote or local stores using an appropriate protocol that may be different from the common protocol, and which may vary among the supplier local and remote stores 128, 104. Thus, proxy stores 124 allow the marketplace store 120 to use a common format for exchanging quotation and order information with all supplier stores. As will be explained in greater detail below, according to example embodiments of the invention, a proxy store 124 is a collection of commands and data configured to maintain and manage its corresponding remote or local store's data assets necessary to support the processes of obtaining and displaying quotations, creating orders by selecting items of interest from quotations, submitting orders, checking the status of submitted orders and generating inventory reports. In one embodiment, the proxy stores 124 are hosted on the same physical computer machine as the marketplace store 120 and the marketplace catalog 122, facilitating sharing of data assets such as the marketplace catalog.

In an example embodiment, a referral relationship exists between the marketplace store 120 and the proxy stores 124. The referral relationship defines the proxy stores that can be accessed from the marketplace store to exchange the information with remote stores and local stores required to support the on-line order and quotation shopping process. A configurable relationship object or list 126 is maintained by the marketplace 100 to define the relationships, and the list 126 includes a unique Marketstore ID identifying the marketplace store 120, and unique proxy store ID's for all the proxy stores 124 participating in the relationship. For each proxy store identified in the list, the list 126 includes an identification of the type of relationship with the marketplace store 120 (such as a referral relationship) and a state flag that enables or disables the relationship.

Figure 2:
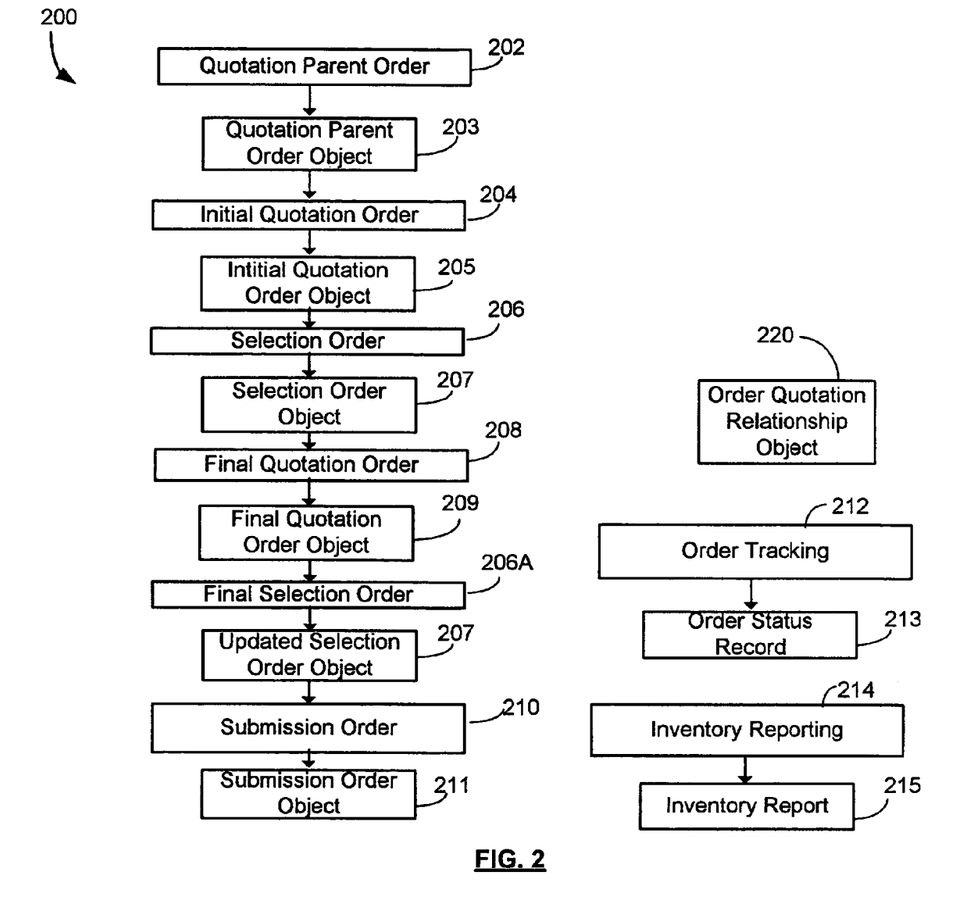
FIG. 2 is a flow diagram of an exemplary process implemented on the system of FIG. 1 and the resulting objects.

FIG. 2 shows a flow diagram of an exemplary ordering and quotation process 200 carried out on system 10, according to embodiments of the invention. By way of overview, the process 200 begins with a quotation parent order process 202, during which a shopper selects assets from the marketplace catalog 122 to produce a quotation parent order object 203. During an initial quotation process 204, the parent quotation order object 203 is passed from the marketplace store 120 to specified proxy stores 124, each of which exchanges information with its corresponding remote store 104 or local store 128, and processes returned quote information to prepare an initial quotation order object 205. During a selection order process 206, the buyer selects items from the initial quotation order objects 205, and based on such selections, the specified proxy store 124 prepares a selection order object 207. During a final quotation process 208, based on the selection order object 207, the proxy store 124 consults with its associated remote store 124 or local store 128, and prepares a final quotation order object 209. During a final selection order process 206A, the shopper makes selections from the final quotation order object 209, and such selections are used to update the selection order object 207. In a submission order process 210, the final selections are passed by the specified proxy stores 124 to their respective remote stores 104, and a submission order object 211 created. Once submission order processing has occurred, an order tracking process 212 can be called to generate an order status record 213. An inventory report process 214 is also available for generating an inventory report 215 for administrative purposes. In process 200, the quotation parent order object 203 is a parent order object, with each of the subsequent order and quotation objects 205, 207, 209 and 211 being child order objects. In order to track the relationship between the parent and child objects, the marketplace 100 generates an order quotation relationship object 220 which includes a separate object for each child object generated during order quotation process 200.

Figure 3:
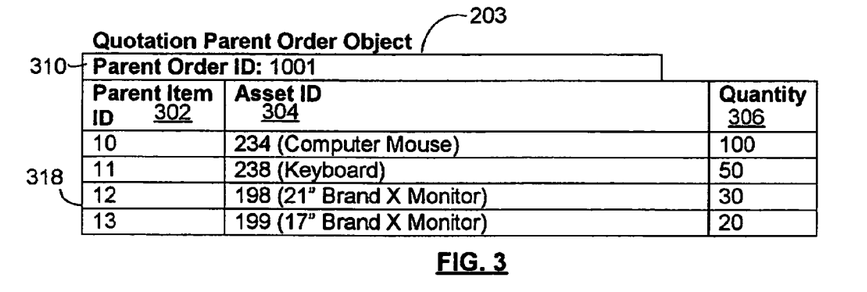
FIG. 3 is a block diagram representation of an example quotation parent order object of FIG. 2.

An overview having been provided, each of the sub-processes of process 200 and the resulting objects will now be described in greater detail. Quotation parent order process 202 involves the building of the quotation parent order object 203 by the marketplace store 120. The quotation parent order object 203 is in one embodiment, a virtual shopping cart that includes a list of assets selected by the shopper from the marketplace catalog 122. FIG. 3 shows some of the attributes of an example quotation parent order object 203, with sample data for explanatory purposes. In the illustrated example, the quotation parent order object 203 includes attributes of:

(1) A unique parent order ID 310 that is assigned by the marketplace store 120 to the specific quotation parent order object 203;

(2) A parent order list 318 of items, including, for each item in the list: (a) a unique order item ID 302, which is a unique identifier for each item entry in the parent order object 203; (b) a unique asset ID 304 identifying the tradable asset that has been selected from the marketplace catalog as an asset for which a quote is sought; the unique asset ID will typically be a SKU number (Stock Keeping Unit ID) that is associated with a product description and other product attributes (for explanatory purposes, truncated product descriptions are shown in FIG. 3); and (c) a quantity 306 representing the needed quantity of the asset.

In various embodiments, the list 318 also includes additional information for each item, including, for example, attributes of: asset unit price and currency identifier as stored in the marketplace catalog 122; estimated shipping charges and shipping and other taxes; and/or a shipping address for the asset.

Figure 4:
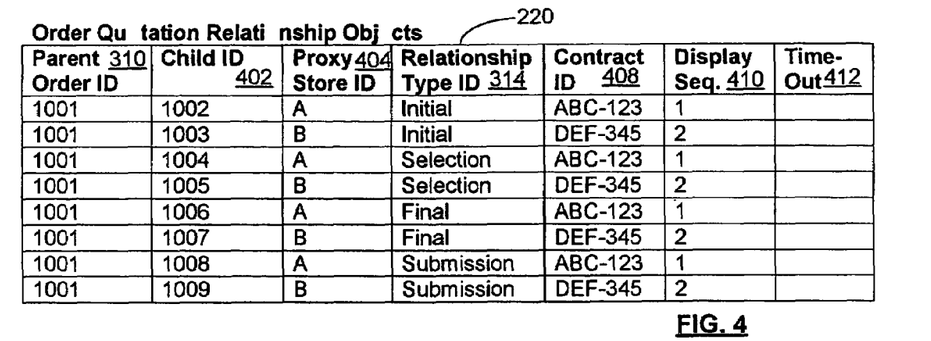
FIG. 4 is a block diagram representation of an example order quotation relationship object of FIG. 2.

As noted above, order quotation relationship objects 220 are generated during process 200. The objects 220 include information about the relationship between the parent order object 203 and the child order objects 205, 207, 209 and 211. With reference to FIG. 4, in one example embodiment, each order quotation relationship object 220 pertains to a single child object and includes the following attributes: a) parent order ID 310 identifying the quotation parent order object; b) a unique child ID 402 as assigned by the proxy store 124 to each child object generated by it through the process 200; c) a proxy store ID 404 identifying the proxy store that created the child order; d) an order quotation relationship type ID 314 identifying the type of order or quotation object; e) a contract identifier 408 identifying a contract that defines the relationship between the marketplace and the remote store; f) a display sequence 410 that can be used by a user interface in the marketplace 100 to determine the sequence in which child objects should be displayed to a shopper; and g) time-out information 412 that can be used by the proxy store 124 to determine when it should stop polling to see if a quotation or submission request has been responded to yet. With respect to contract identifier 408, contracts (which are predetermined rules) are used to define relationships between the marketplace 100 and remote stores 104. Among other things, the contract between the marketplace 100 and a specific remote store 104 defines the format and protocol of exchanges between the marketplace 100 and the specific remote store. For example, in one embodiment, a policy command is invoked in a proxy store in order to send a quotation request to its associated remote store—this policy command is referenced in the contract between the marketplace 100 and the remote store.

In one embodiment, the order quotation relationship type ID 314 can assume one of the following values: Initial—when the child object is an initial quotation object 205 generated for items in a quotation parent order request object; Selection—when the child object is a selection order object 207 that represents the shopper's specified quantities of items selected from an initial quotation; Final—when the child object is a final quotation object 209 generated for items in the selection order object; and Submission—when the child object is a submission order object 211. In one embodiment, each order quotation process 200 in the marketplace can have one initial quotation object, one selection order object and one final quotation object for each marketplace store-proxy store and contract pair. The process 200 may have multiple submission order objects for each store and contract pair.

Figure 5:
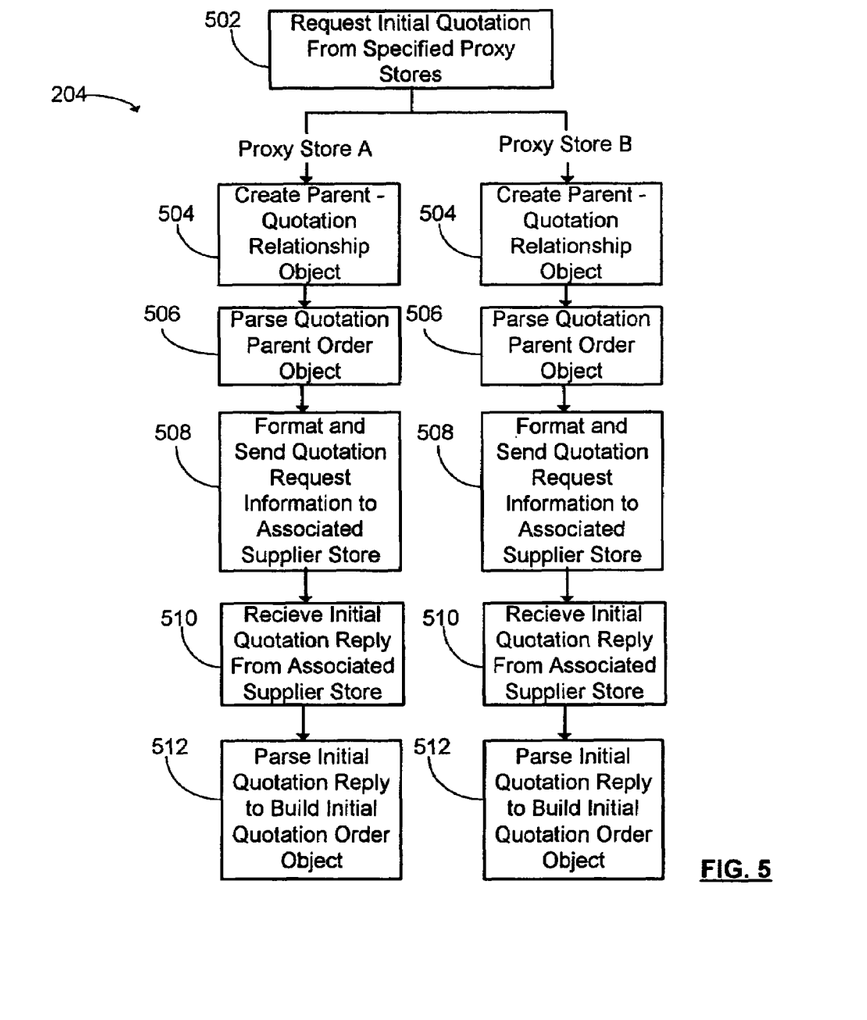
FIG. 5 is a flow diagram of an example initial quotation process of FIG. 2.
Figure 6:
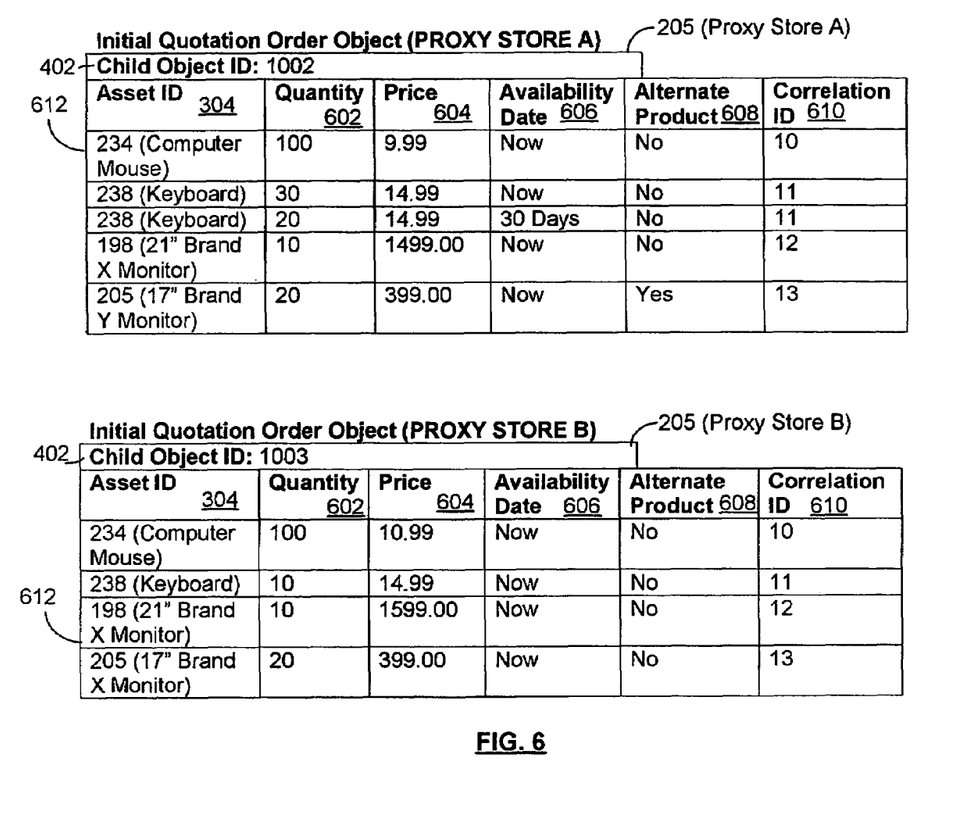
FIG. 6 is a block diagram representation of an example initial quotation object of FIG. 2.

Turning again to quotation parent order process 202, a user interface presented by the marketplace store 120 to the shopper allows the shopper to request that an initial quote be provided for assets that have been added to the quotation parent order object 203. Upon the shopper making such request, the initial quotation order process 204 begins. A flow diagram of an example initial quotation order process 204 is shown in FIG. 5. In some embodiments, upon requesting and initial quote, the shopper will be provided with the opportunity to specify from which supplier remote and local supplier stores 104, 128 the shopper would like to receive quotes from. In some embodiments, the valid selection of specified supplier stores may be limited to those that the shopper has been previously authorized to order from. As indicated in step 502 of FIG. 5, once the shopper has indicated that an initial quote is wanted and the desired supplier stores specified, the marketplace store 120 passes an initial quotation request to each of the proxy stores 124 (A and B in the example of FIG. 5) that are associated with the specified remote or local stores 104, 120. Each proxy store 124 then processes the initial quotation request as indicated in FIG. 5 to build an initial quotation order object 205 for the specific proxy store, examples of which are shown in FIG. 6. In the example of FIGS. 5 and 6 two remote stores 104 are specified as stores from which quotes are sought, with proxy store A 124 being associated with one remote supplier store 104, and proxy store B 124 being associated with the other. The initial quote process 204 is carried out at each of the proxy stores.

As indicated at step 504, an "Initial" Order Quotation Relationship Object 220 is created by each proxy store for the two new child initial quotation order objects 205 (having child ID's 402 with values of 1002 and 1003, respectively). As indicated in step 506, each proxy store 124 then parses the quotation parent order object 203 for the information required by its respective associated remote stores 104 to provide an initial quote, then formats such information in an appropriate format and sends it over network 112 to its associated remote store 104 (Step 508). In one embodiment, the quotation request information that is sent to each remote store substantially includes the contents of quotation parent order object 203, along with an indication that the quote being requested is an initial quote. In one embodiment the proxy stores 124 and the marketplace store 120 are each hosted on the same commerce instant allowing each to have access to marketplace catalog 122. In some embodiments, the asset ID in the marketplace catalog may not be the same as the ID that is used at the remote store 104 to identify the selected asset, and there may be a need to map the catalog asset ID to the asset ID used at the remote store. Such mapping can be performed by middleware such as CROSSWORLDS™, available from IBM, while transferring the quotation request to the remote store, and receiving a response back from the remote store.

Once the initial quote request is sent to its associated remote store 104, each proxy store 124 will poll its associated remote store 104 for a reply to the quotation request for the timeout period specified in the time out attribute 412 of the order quotation relationship object 220. Assuming a proxy store 124 receives an initial quotation response from its associated remote store 104 (step 510), the proxy store parses the response to build the initial quotation object 205 (step 512). In one embodiment, the initial quote response received from the remote store is parsed by the proxy store 124 to generate an initial quotation object 205 having an initial quote list 612 with the following attributes for each item in the quote list: (a) the unique asset ID 304; (b) the quantity 602 of the asset that is available for purchase; (c) the price 604 that the asset is available for purchase at; (d) an estimated availability date 606; and (d) a correlation ID 610 correlating the item in the quotation list 612 to an item in the parent order list 318. Each proxy store also includes in the initial quotation object 205 (step 608) the unique child object identifier 402 for the initial quotation object.

As can be appreciated from the initial quotation order object 205 (Proxy Store A) of FIG. 6, the remote store associated with Proxy Store A has replied with two items in list 512 that share a common correlation ID, and are hence both linked to the same parent order item. In the illustrated example, two items share correlation ID Number 11, as the remote store has indicated in its initial quote response that it can supply 30 of the requested keyboards immediately, and 20 in 30 days, thereby splitting the parent order item into two initial quotation response items. In some embodiments, alternative options for the same asset can be provided as different items in the initial quotation list 512, for example, in one item in the initial quotation list, the asset may be offered at one price for one availability date, and as another item in the list, the asset may be offered at another price for a different availability date. In such case, the items for the same asset will both have the same correlation ID.

As can be appreciated from FIG. 6, the initial quotation list 612 can include asset substitutions (see proxy store A list), wherein the remote store has responded to the initial quote request with a price for an asset that is similar to but not the same as the asset for which a quote was requested. In the illustrated example, the remote store associated with proxy store A has responded with quote information for Brand Y 17" monitors, in place of the requested Brand X 17" monitors. In such case, the proxy store A124 recognizes that the asset ID associated with a correlation ID in the initial quotation response is different from the asset ID in the parent quotation order object, and sets an alternate product flag attribute 608 of the associated item in list 612 to indicate the substitution.

Correlation ID 610 will now be addressed more generally. Correlation IDs 610 are used in each of the child quotation, selection and submission order objects 203, 205, 207, 209, 211 to permit items in the lists of such objects to be linked to corresponding items in the parent order list 318, thus providing mapping between a single parent order list item and corresponding child quotation, selection and submission order list item(s). Such correlation IDs permit mapping between parent order items and substitute quotation items and allow the quantities of required assets associated with items in the parent order to be reduced once a submission order for such assets has been made.

In addition to the attributes shown in FIG. 6, in an example embodiment the initial quotation object 205 also includes a supplier part number for each asset in the list 612, and supplier data that is opaque to the marketplace 100 and which can be sent to the remote store 104 when a selection order is submitted for processing—for example, supplier data could include a remote store's distribution center identifier.

Figure 7:
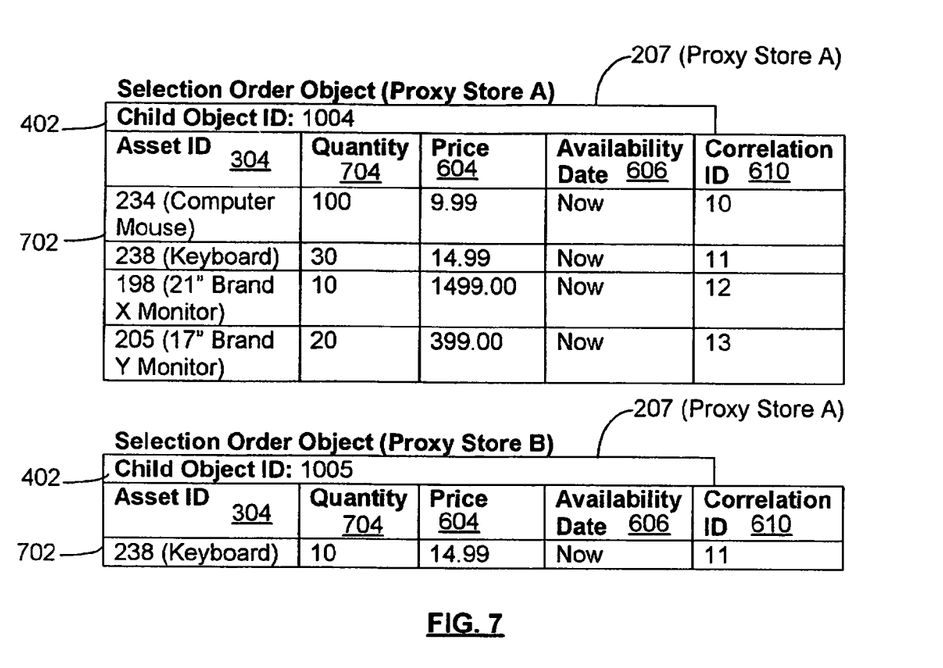
FIG. 7 is a block diagram representation of an example selection order object of FIG. 2.
Figure 8:
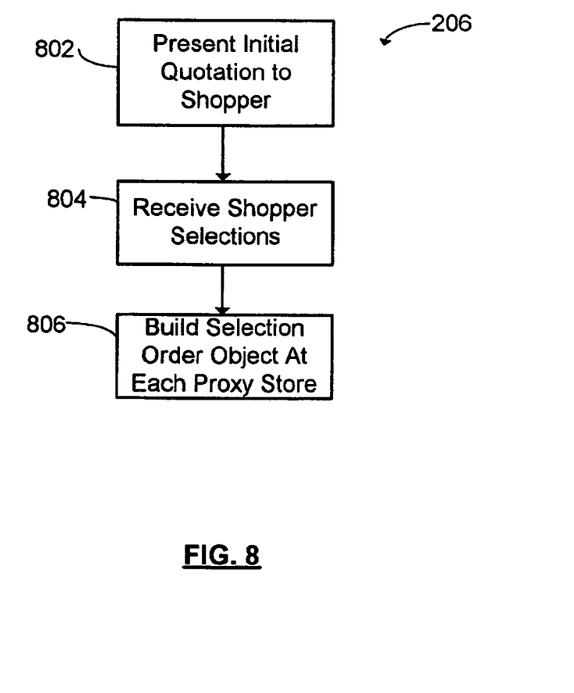
FIG. 8 is flow diagram of an example selection order process of FIG. 2.

Turning again to FIG. 2, once the initial quotation object 205 has been finalized, the selection order process 206 begins, during which a selection order object 207 is produced by each participating proxy store 124. The attributes of an example selection order object 207 (Proxy Store A) and selection order object (Proxy Store B) are shown in FIG. 7, and an example selection order process 206 shown in FIG. 8. As indicated in FIG. 8, at the start of the selection order process 206, the shopper is presented by a user interface implemented by the marketplace store 120 with the quote lists 612 of the initial quotation objects 205 for all remote stores (step 802) that have provided bids. In one embodiment, the information is presented to the user in a format similar to that shown in FIG. 6, with an interface being provided such that the shopper, using browser 108, can select quote items from each of the displayed quote lists 612, and the number or volume of the asset that they want final quotes on from each supplier store (step 804). Based on such selections, each of the participating proxy stores 124 that are associated with remote stores 104 from which final quotes have been requested on specified items builds a corresponding selection order object 207 (step 806), having, in one example embodiment, the attributes shown in FIG. 7. Each selection order object 207 includes a selected items list 702 that represents the items selected by the shopper from the corresponding initial quote list 612. Each item in list 702 corresponds to a tradable asset for which a final quotation from the associated remote store 104 is being sought, and each selected list item includes: (a) the unique asset ID 304; (b) a quantity 704 of the asset that the shopper has indicated that they want a final quote on from the specified remote store; (c) the quoted price 604 of the asset; (d) the projected availability date 606; and (e) the correlation ID 610 linking the child item back to an item in the original parent order list 318. The unique asset ID 304, quoted price 604, availability date 606, and correlation ID 610 will typically be copied from the initial quote list that the items in selected items list 702 have been copied from. In addition to the attributes shown in FIG. 7, the items in selected items list 702 can also include other attributes, such as attributes representative of asset shipping charges, asset shipping taxes, asset taxes, total asset price (quantity X asset unit price), currency, asset shipping addresses and/or the supplier part number and supplier data referred to above. The selection order object 207 also has linked to it a unique child object ID 402 (No. 1004 for the selection for proxy store A, and No. 1005 for the selection for proxy store B in the illustrated example). While building the selection order object 207, the proxy stores 124 each create a "selection" order quotation relationship object 220.

Turning again to FIG. 2, after selection order process 206, each proxy store 124 through which a final quote has been requested carries out final quotation process 208 to produce final quotation object 209. Final quotation process 208 is similar to initial quotation process 204, with one notable exception being that further asset substitutions by the remote stores 104 are not permitted. Process 208 begins with each participating proxy store 124 sending a final quote request over network 112 to its corresponding remote store 104. The quote request includes all or some of the information of selection order object 207, along with an type identifier identifying the quote request as a final quote request.

Figure 9:
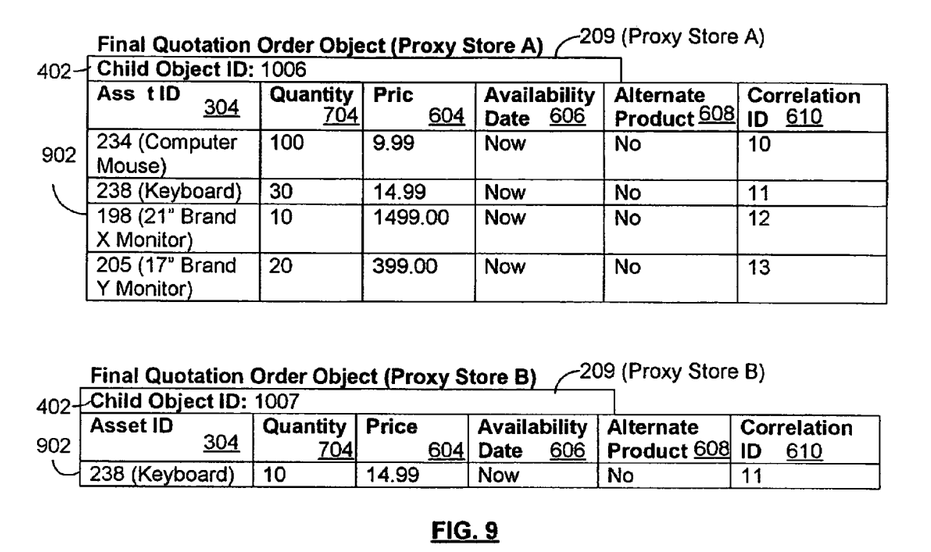
FIG. 9 is a block diagram representation of an example final quotation object of FIG. 2.

After sending out a final quote request to its associated remote store 104, each proxy store 124 waits for a final quotation response from its remote store 104. Each remote store builds a final quote response based on the information contained in the final quote request that it receives, and in preparing a final quote response. The final quote response may include different information than the initial quote response—for example, it may include different prices for assets as a result of changes made by the shopper in requested quantity between the initial and final quote requests. Each proxy store will poll its associated remote store for a final quote response for the time set in the order quotation relationship object 220. Assuming a proxy store 124 receives a reply to the final quote request, it uses the information contained in the reply, along with the information contained in its selection order object 207 and the order quotation relationship objects 220 to prepare the final quotation object 209, an examples of which are shown in FIG. 9 for proxy stores A and B of the illustrated example. Each final quotation object 209 includes substantially the same attributes as initial quotation object 205, and includes a final quotation items list 902. As can be appreciated from FIG. 9, in the illustrated example, the final quotation object 209 for proxy store A is assigned child object ID No. 1006, and the final quotation object 209 for proxy store B is assigned child object ID No. 1007. "Final" quotation order quotation relationship objects 220 are created for each final quote process, as shown in FIG. 4.

During final selection order process 207A, a marketplace interface presents the shopper with final quotation lists 902 from each of the final quotation order objects 209, and gives the shopper the opportunity to select items in the final quotation lists 902 for submitting an order. Based on the shopper's selections, each proxy store 124 that previously created a selection order object 207 updates its selection order object 207 accordingly.

Figure 10:
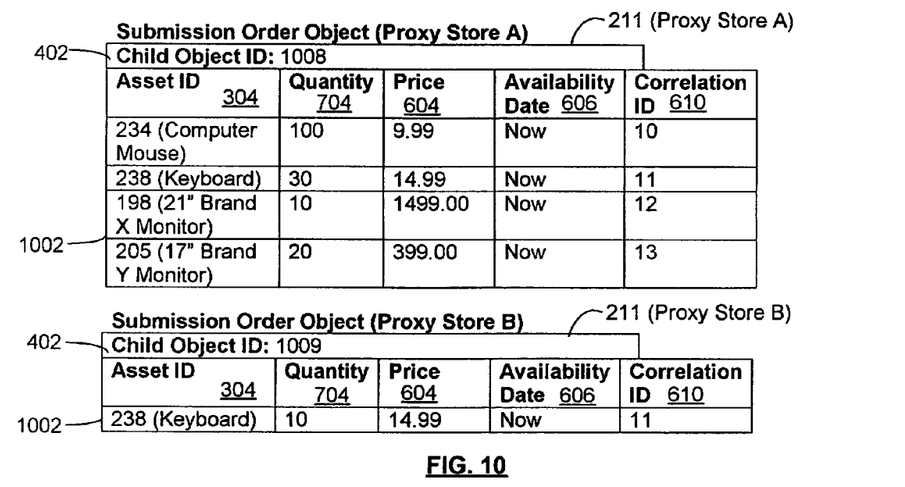
FIG. 10 is a block diagram representation of an example submission order object of FIG. 2.

During submission order process 210, upon shopper request, a submission order is sent by a participating proxy store 124 to its associated remote store 104. The submission order includes information from selection list 107 of the selection order object 207, along with an order type identifier identifying the order as a submission order. Each proxy store that submits a submission order builds a submission order object 211. Examples of submission order objects generated by proxy stores A and B are shown in FIG. 10. Each submission order object 211 has attributes similar to those of selection order object 207, and includes a submission order list of items 1002, each item in the list setting out, among other things, a tradable asset that the shopper is ordering from the associated remote store, the quantity of the asset ordered, and the pricing of the asset. A unique child object ID 402 is assigned to each submission order object 211 (child object ID 1008 is assigned to submission order 211 for proxy store A and child object ID 1009 is assigned to submission order 211 for proxy order B), and an associated "submission" order quotation relationship object 220 (see FIG. 4) created for each submission order object. In some cases, the shopper is hyperlinked to a website at the remote store 104 during the submission order process 210, with steps (such as payment processing) that need to be carried out to complete the shopping process being done at the remote store 104.

After the submission order has been passed to the remote store, the proxy store 124 may reduce the desired asset quantities in the quotation parent order object 203 to reflect that the shopper has submitted a submission order for such assets.

Figure 11:
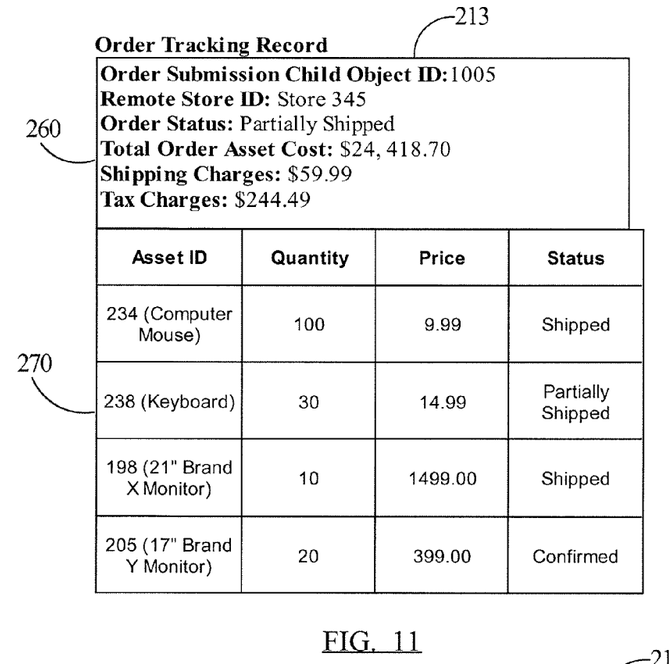
FIG. 11 is a block diagram representation of an example order record of FIG. 2.

As noted above, in an example embodiment, order tracking process 212 can be used to generate order tracking record 213. An order submitted to the remote store 104 for processing will typically be involved in a sequence of fulfillment activities. For example, after payment for the order is authorized, all or a subset of the specified tradable assets can be shipped, and the order billed. An order or part of an order may be cancelled prior to shipping. In one example embodiment, the remote store 104 carries out order tracking process 212 to produce order tracking record 213, which is then sent over network 112 to the proxy store 124 associated with the remote store. Such process may be carried out periodically by the remote store 104 as a scheduled activity, or upon promoting from the proxy store 124. FIG. 11 shows an order tracking record 213 (for items ordered through proxy store A) according to an example embodiment of the invention. The example record 213 includes a general attribute section 260 that contains general attributes for a particular submission order, such as: Submission order child object ID; remote store identifier; general order status; total order asset cost; total order shipping charges; and total order tax charge. The example order tracking record 213 also includes a list 270 of ordered assets, including for each item in the list, the asset ID, quantity ordered, quantity shipped, unit price, and asset order status. Once an order tracking record 213 has been sent to the proxy store, it can be viewed on a marketplace Web page by an authorized shopper using browser 108.

As noted above, in an example embodiment, inventory reporting process 214 can be used to generate inventory report 215. Inventory reports provide a snapshot view of the current inventory totals held by the remote stores 104. Remote stores 104 can periodically send inventory updates to their proxy stores 124 about the status of their on-hand inventory. Proxy stores can also request inventory status updates from their remote stores. The updates are then used by the proxy stores to generate inventory reports 215.

Figure 12:
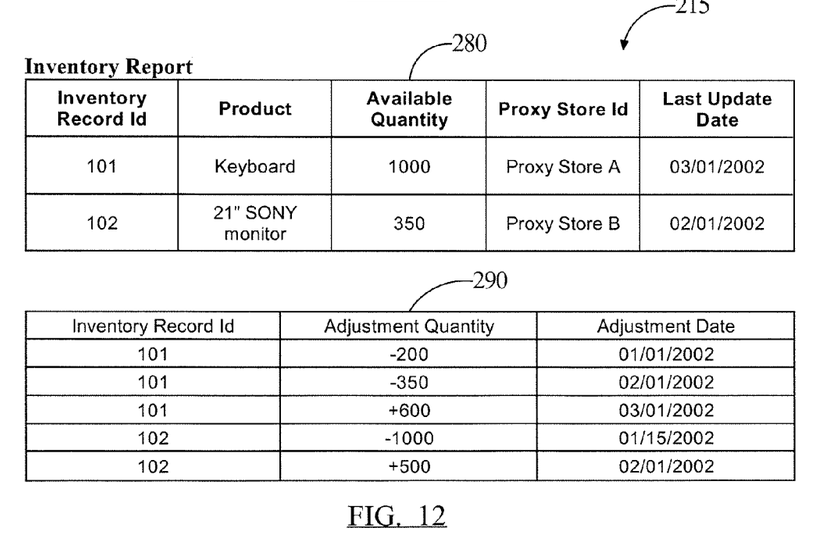
FIG. 12 is a block diagram representation of an example inventory record of FIG. 2.

With reference to FIG. 12, organization of an example inventory report 215 is shown. A first table 280 stores products' most recent inventory levels. A second table 290 shows the history of inventory adjustments obtained from the remote stores 124. For example, inventory record 101 has been updated three times in the year 2002, on January 01, February 01 and March 01. As of March 01, remote store A had 1000 keyboards. From the inventory adjustments record it can be seen that remote store A increased its inventory level for this product by 600 units on March 01. This number represents the difference between the number of keyboards received from the manufacturer and the number of keyboards sold between February 01 and March 01. Thus, on February 01, store A had 400 (1000–600) keyboards. The preceding inventory adjustment record for inventory record 101 indicates that inventory level decreased by 350 units in the month of January. Thus, on January 01, store A had 750 (400+350) keyboards.

In some embodiments, quotes are obtained from and orders placed with local stores 128 through associated proxy stores 124 in a manner similar to that described above in respect of remote stores 104. In some embodiments, shoppers may forgo some or all of the intermediate processes 104, 206 and 208. For example, in one embodiment, the shopper is given an option to place a submission order directly from the quotation parent order object, without going through the intervening initial quote, selection, and final quote order processes. In some embodiments, additional processes may be performed, for example the shopper may want to go through the initial quotation process 205 a number of times.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer system hosting an executable commerce site for exchanging commerce information with a plurality of remote store sites and shopper clients over a computer network, the executable commerce site comprising:

a marketplace store for exchanging information with shopper clients and remote store sites through the computer network; and a plurality of proxy stores, each proxy store corresponding with one of the remote store sites for communicating therewith over the computer network and acting as an intermediary for information exchanged between the corresponding remote store site and the marketplace store;

a catalog identifying an aggregation of assets offered through a plurality of remote store sites connected to the computer network; wherein the marketplace store has access to the catalog for creating a parent list identifying assets selected from the catalog by one of the shopper clients over the network; and each proxy store is configured for reading the parent list and creating a first request identifying at least some of the assets in the parent list and sending the first request over the computer network to the remote store site associated therewith.

2. The computer system of claim 1, wherein each proxy store is configured for (a) receiving an associated initial quote response from its associated remote store site in reply to the first request, the initial quote response identifying at least some of the assets identified in the first request and associated prices, and (b) creating an associated initial quote list identifying the assets and associated prices identified in the initial quote response, the commerce site including an interface for presenting to the shopper client the initial quote lists associated with a plurality of the proxy stores.

3. The computer system of claim 2, wherein an associated initial quote response can identify substitute assets and associated prices in place of at least some of the assets identified in the first request, each proxy store being configured to identify in the initial quote list associated therewith any substitute assets and associated prices identified in the initial quote response received by the proxy store, the commerce site interface permitting a client shopper to select assets and substitute assets from the presented initial quote lists, each proxy store being further configured for (c) creating an associated selection list identifying the assets and substitute assets selected by the client shopper from the initial quote list associated with the proxy store, and (d) sending the associated selection list over the computer network to the computer remote store associated therewith.

4. The computer system of claim 3, wherein the marketplace store is configured to assign a unique identifier to each asset listed in the parent list, each proxy store being configured to assign a correlation ID to each asset and substitute asset listed in the initial quote and selection lists thereby correlating the assets listed therein to assets listed in the parent list.

5. The computer system of claim 2, wherein the parent list includes, for each identified asset, a desired quantity of the asset as selected by the shopper client, the proxy stores including the desired quantities in the first requests associated therewith, the initial quote responses each identifying an available quantity of the assets identified therein, the available quantity being included in the presented initial quote lists, the commerce site interface permitting a client shopper to select assets from the presented initial quote lists and specify an updated desired quantity of the selected assets, each proxy store being further configured for (c) creating an associated selection list identifying the assets selected by the client shopper from the initial quote list associated with the proxy store and the specified updated desired quantity thereof, and (d) sending the associated selection list over network to the remote store associated therewith.

6. The computer system of claim 5, wherein the initial quote responses include a projected availability date for the assets identified therein and a quantity of the asset available on the availability date.

7. The computer system of claim 2, the commerce site interface permitting a client shopper to select assets from the presented initial quote lists, each proxy store being further configured for (c) creating an associated selection list identifying the assets selected by the client shopper from the initial quote list associated with the proxy store, and (d) sending the associated selection list over network to the remote store associated therewith.

8. The computer system of claim 7, each proxy store further configured for (e) receiving an associated further quote response from its associated remote store site in reply to the selection list, the further quote response identifying the assets identified in the selection list and associated prices, and (f) creating an associated further quote list identifying the assets and associated prices identified in the further quote response; the commerce site interface configured for presenting to the shopper client the further quote lists.

9. The computer system of claim 8, the commerce site interface permitting a client shopper to select assets from the presented further quote lists, each proxy store being further configured for (g) updating the associated selection list associated therewith to identify the assets selected by the client shopper from the further quote list associated with the proxy store, and (h) sending the updated selection list over network to the remote store associated therewith.

10. The computer system of claim 1, wherein the marketplace catalog, marketplace store and the proxy stores are all resident on a common computer coupled to the computer network.

11. The computer system of claim 1, wherein each proxy store is configured to receive status information from the remote store associated therewith about orders for assets submitted to the remote store associated therewith, the commerce site including an interface for presenting the status information to a requesting shopper client.

12. The computer system of claim 1, wherein each proxy store is configured for receiving and storing inventory information received from the remote store associated therewith.

13. A method of processing information through a network connected to a marketplace commerce site, a plurality of remote store sites, and a shopper client, the method comprising the steps of:
  a) providing at the commerce site a catalog identifying an aggregation of assets available through the remote store sites;
  b) providing at the commerce site a marketplace store interface through which a shopper at the shopper client can select assets from the catalog;
  c) providing at the commerce site a plurality of proxy stores, each proxy store representing an associated remote store site;
  d) generating and storing at the marketplace commerce site, a parent order object that includes a parent list of parent items, each parent item identifying an associated asset selected by the shopper from the catalog; and
  e) generating first requests at selected proxy stores that are associated with remote store sites specified by the shopper first request, each of the selected proxy stores sending the first request generated thereby to its associated remote store over the network, the first requests each identifying assets identified in the parent list.

14. The method of claim 13, further comprising the steps of:
  f) receiving at the proxy stores from the remote store sites associated therewith a first quote response identifying quote prices for at least some of the assets identified in the first requests; and
  g) generating at each proxy store receiving a first quote response an associated first child object that includes a list of first quote items, each first quote item including: (i) an asset identifier identifying a quoted asset for which a first quote has been received, (ii) the quote price for the quoted asset, (iii) an available quantity of the quoted asset, and (iv) a correlation ID linking the first quote item to a corresponding one of the parent items.

15. The method of claim 14, further comprising the steps of:
  h) presenting through the marketplace commerce site information included in the first child objects generated by the proxy stores and accepting shopper selections of assets identified in the first child objects;
  i) generating the proxy stores associated second child objects that each include a list of selected items identifying the assets and a quantity thereof selected by the shopper from the first child object associated with the proxy store; and
  j) sending further requests from the proxy stores to the associated remote store sites, the further request from each proxy store including identification of selected assets and the quantity thereof from the associated second child object.

16. The method of claim 13, further comprising the step of:
  receiving at proxy stores from the remote store sites associated therewith status information about previous orders for assets made to the associated remote store sites.

17. The method of claim 13, further comprising the step of:
  receiving at proxy stores from the remote store sites associated therewith inventory information about assets available through the associated remote store sites, and storing the received inventory information at the marketplace commerce site.

18. A computer program product having a computer-readable medium tangibly embodying computer executable instructions for a marketplace site that communicates with a plurality of remote store sites and a shopper client over a network, the computer executable instructions comprising:
  (a) computer executable instructions for implementing a catalog identifying an aggregation of assets available through the remote store sites;
  (b) computer executable instructions for implementing a marketplace store interface through which a shopper at the shopper client can select assets from the catalog, the marketplace store interface configured for generating and storing at the marketplace site, a parent order object that includes a parent list of parent items, each parent item identifying an associated asset selected by the shopper from the catalog; and
  (c) computer executable instructions for implementing a plurality of proxy stores, each proxy store representing an associated remote store site, the proxy stores configured for generating associated first requests and sending the generated first requests to the remote store sites associated therewith, the first requests each identifying assets identified in the parent list.

* * * * *